(12) United States Patent
Deluca et al.

(10) Patent No.: US 8,392,516 B2
(45) Date of Patent: Mar. 5, 2013

(54) DISPLAYING EMAIL MESSAGES BASED ON RESPONSE TIME TRENDS

(75) Inventors: Lisa Seacat Deluca, Research Triangle Park, NC (US); Itzhack Goldberg, Research Triangle Park, NC (US); Ohad Greenshpan, Research Triangle Park, NC (US); Boaz Mizrachi, Research Triangle Park, NC (US)

(73) Assignee: International Business Machines Corporation, Armonk, NY (US)

( * ) Notice: Subject to any disclaimer, the term of this patent is extended or adjusted under 35 U.S.C. 154(b) by 657 days.

(21) Appl. No.: 12/578,459

(22) Filed: Oct. 13, 2009

(65) Prior Publication Data

US 2011/0087743 A1    Apr. 14, 2011

(51) Int. Cl.
*G06F 15/16* (2006.01)
(52) U.S. Cl. ......... 709/206; 709/204; 709/205; 709/207
(58) Field of Classification Search ................... 709/204, 709/205, 206, 207
See application file for complete search history.

(56) References Cited

U.S. PATENT DOCUMENTS

| | | | | |
|---|---|---|---|---|
| 2004/0243679 | A1* | 12/2004 | Tyler | 709/206 |
| 2009/0037532 | A1* | 2/2009 | Estrada | 709/205 |
| 2010/0017194 | A1* | 1/2010 | Hammer et al. | 704/9 |
| 2010/0017484 | A1* | 1/2010 | Accapadi et al. | 709/206 |
| 2010/0169264 | A1* | 7/2010 | O'Sullivan et al. | 706/52 |
| 2010/0211592 | A1* | 8/2010 | Brownlee | 707/769 |
| 2010/0250682 | A1* | 9/2010 | Goldberg et al. | 709/206 |

OTHER PUBLICATIONS

Office Action dated May 9, 2012 for U.S. Appl. No. 12/578,453, Lisa Seacat Deluca et al., "Apparatus, System, and Method for Retaining Email Response Time Trends", filed Oct. 13, 2009.

* cited by examiner

*Primary Examiner* — Liangche A Wang
*Assistant Examiner* — Cheikh Ndiaye
(74) *Attorney, Agent, or Firm* — Thomas E. Lees, LLC (57) ABSTRACT

An apparatus, system, and method are disclosed to display a set of email messages based on response time trends. An email identification module identifies a set of email messages for a user. A response time identification module determines one or more response time trends and each response time trend corresponds to at least one email message in the set of email messages. An email display module displays the set of email messages to the user. A response time display module displays a visual representation of each response time trend to the user such that each visual representation is visually associated with the at least one email message in the displayed set of email messages.

16 Claims, 6 Drawing Sheets

| | 510 From | 512 Subject | 514  516 Sender Response Time ▼ |
|---|---|---|---|
| 502 ✉ 504 | Sender1 | RE: Presentation | 518 ▮▯ 9 min. |
| 506 ✉ | Sender2 | Weekend Plans | 520 ▮▮▮▮ 8.2 hrs. |
| 508 ✉ | Sender3 | On Sale Now | 522 ▮▮▮▮▮ Never |
| ✉ | Sender4 | Today's Meeting | 524 Replied |

| | 560 To | 562 564 Time to Response ▼ | 566 Subject |
|---|---|---|---|
| 552 ✉ 554 | Recipient1 | 568 ◐ 3.7 hrs. | Dinner Tonight? |
| 556 ✉ | Recipient2 | 570 ◐ 21 hrs | Draft Document |
| 558 ✉ | Recipient3 | 572 ● Never | June Report |
| ✉ | Recipient4 | 574 ○ Received | Important Deadline |

DISPLAYING EMAIL MESSAGES BASED ON RESPONSE TIME TRENDS

FIELD OF THE INVENTION

This invention relates to email response time trends and more particularly relates to displaying email messages based on email response time trends.

BACKGROUND

Description of the Related Art

Unlike more traditional communication methods, many electronic communication methods lack immediate feedback. When communicating verbally, one can hear and often see other participants in the conversation, and their responsiveness and availability can easily be gauged. When communicating via email, instant messaging, or online via blogs, forums, wiki's, or other collaboration tools, however, other participants can be located throughout the world, and traditional verbal and visual feedback is not available to gauge responsiveness and availability.

If an email message is urgent, it can be important to know when one can expect to receive a response. It can also be important to know how soon to follow up an email with an additional communication if a response is not received. Sending multiple messages requesting the same response, when the recipient has not yet read the original message, can be inefficient and counterproductive for the sender. Likewise, unnecessarily delaying a response to an email message, or forgetting to respond, is also inefficient.

Other factors, such as time differences, conflicting schedules, and vacations, can also affect email responsiveness. These factors may be unknown to an email's sender, who may be futilely waiting for a response from an unavailable recipient. Traditionally, some email and instant messaging clients show an available/unavailable status that indicates whether or not a user is currently at their computer. While useful, the fact that a user is at their computer, does not necessarily mean that they will respond. Additionally, a user can typically override their status. A user may, in reality, be available and responsive, while their status is unavailable, or unresponsive while their status if available.

BRIEF SUMMARY

From the foregoing discussion, it should be apparent that a need exists for an apparatus, system, and method that display email response time trends. Beneficially, such an apparatus, system, and method would display a set of email messages based on response time trends.

The present invention has been developed in response to the present state of the art, and in particular, in response to the problems and needs in the art that have not yet been fully solved by currently available email responsiveness metrics. Accordingly, the present invention has been developed to provide an apparatus, system, and method for displaying email messages based on response time trends that overcome many or all of the above-discussed shortcomings in the art.

The apparatus to display a set of email messages based on response time trends is provided with a plurality of modules configured to functionally execute the necessary steps of displaying email messages. These modules in the described embodiments include an email identification module, a response time module, a trend module, an email display module, a response time display module, a sort module, a schedule module, a responded module, an estimate module, and a filter module.

In one embodiment, the email identification module identifies a set of email messages for a user. In another embodiment, the set of email messages comprises email messages received by the user. In a further embodiment, the set of email messages comprises a set of sent email messages sent by the user.

In one embodiment, the response time module determines a plurality of response times corresponding to one of a sender and a recipient for one or more email messages in the set of email messages. In a further embodiment, each response time is based on an elapsed time between a send time that the user sends an email message and a receive time that the user receives an email response to the email message.

In one embodiment, the trend module determines one or more response time trends based on the plurality of response times. In another embodiment, the trend module associates each response time trend with at least one email message in the set based on the corresponding one of a sender and a recipient. In a further embodiment, the trend module selects a response time trend for association with one of the email messages based on a content identifier for the email message. In one embodiment, each response time trend is for a current day of the week. In another embodiment, each response time trend is for a current time of day for a current day of the week.

In one embodiment, the email display module displays the set of email messages to the user. In one embodiment, the response time display module displays a visual representation of each response time trend to the user. In a further embodiment, each visual representation of a response time trend is visually associated with at least one corresponding email message in the displayed set of email messages. In another embodiment, the visual representation comprises an identifier representing a content identifier for a corresponding email message.

In one embodiment, the sort module sorts the set of email messages corresponding to the plurality of recipients based on the one or more response time trends. In a further embodiment, the sort module sorts the set of email messages in sequential order from a shortest response time to a longest response time based on the one or more response time trends.

In one embodiment, the estimate module determines an expected response time for a sent email message based on a response time trend corresponding to a recipient of the sent email message. In a further embodiment, the expected response time comprises an amount of time in which the user is likely to receive a response to the sent email message. In another embodiment, a visual representation corresponding to the sent email message comprises a representation of the expected response time.

In one embodiment, the schedule module adjusts the expected response time based on schedule information of the recipient of the sent email message. In a further embodiment, the schedule module dynamically updates one or more of the visual representations based on schedule information of the recipient. In one embodiment, the schedule information comprises a timezone of the recipient and one or more calendar items of the recipient.

In one embodiment, the responded module places an email message toward an end of the displayed set of email messages based on an email response to the email message. In one embodiment, the filter module filters one or more user selected email messages from the set of sent email messages based on input from the user indicating that the user does not expect a response to the one or more selected email messages.

A system of the present invention is also presented for displaying a set of email messages based on response time trends. The system may be embodied by a data storage repository and an email client computing device. In particular, the email client computing device, in one embodiment, includes a response time display module that is substantially similar to the apparatus described above.

The data storage repository, in one embodiment, is configured to store one or more email response time trends. The email client computing device, in one embodiment, is in communication with the data storage repository. In a further embodiment, the email client computing device comprises a response time display module that is configured to display a set of email messages to a user based on the one or more response time trends.

A method and a computer program product of the present invention are also presented for displaying a set of email messages based on response time trends. The method and the operations of the computer program product in the disclosed embodiments substantially include the steps necessary to carry out the functions presented above with respect to the operation of the described apparatus and system.

In one embodiment, the method and the operations include identifying a set of email messages for a user. In another embodiment, the method and the operations include determining one or more response time trends, each response time trend corresponding to at least one email message in the set of email messages. In a further embodiment, the method and the operations include displaying the set of email messages to the user. The method and the operations, in another embodiment, include displaying a visual representation of each response time trend to the user such that each visual representation of a response time trend is visually associated with the at least one corresponding email message in the displayed set of email messages.

Reference throughout this specification to features, advantages, or similar language does not imply that all of the features and advantages that may be realized with the present invention should be or are in any single embodiment of the invention. Rather, language referring to the features and advantages is understood to mean that a specific feature, advantage, or characteristic described in connection with an embodiment is included in at least one embodiment of the present invention. Thus, discussion of the features and advantages, and similar language, throughout this specification may, but do not necessarily, refer to the same embodiment.

Furthermore, the described features, advantages, and characteristics of the invention may be combined in any suitable manner in one or more embodiments. One skilled in the relevant art will recognize that the invention may be practiced without one or more of the specific features or advantages of a particular embodiment. In other instances, additional features and advantages may be recognized in certain embodiments that may not be present in all embodiments of the invention.

These features and advantages of the present invention will become more fully apparent from the following description and appended claims, or may be learned by the practice of the invention as set forth hereinafter.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Many of the functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions which may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. Where a module or portions of a module are implemented in software, the software portions are stored on one or more computer readable mediums.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing.

More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device. Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Reference throughout this specification to "one embodiment," "an embodiment," or similar language means that a particular feature, structure, or characteristic described in connection with the embodiment is included in at least one embodiment of the present invention. Thus, appearances of the phrases "in one embodiment," "in an embodiment," and similar language throughout this specification may, but do not necessarily, all refer to the same embodiment.

Furthermore, the described features, structures, or characteristics of the invention may be combined in any suitable manner in one or more embodiments. In the following description, numerous specific details are provided, such as examples of programming, software modules, user selections, network transactions, database queries, database structures, hardware modules, hardware circuits, hardware chips, etc., to provide a thorough understanding of embodiments of the invention. One skilled in the relevant art will recognize, however, that the invention may be practiced without one or more of the specific details, or with other methods, components, materials, and so forth. In other instances, well-known structures, materials, or operations are not shown or described in detail to avoid obscuring aspects of the invention.

Aspects of the present invention are described below with reference to schematic flowchart diagrams and/or schematic block diagrams of methods, apparatuses, systems, and computer program products according to embodiments of the invention. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the schematic flowchart diagrams and/or schematic block diagrams block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the schematic flowchart diagrams and/or schematic block diagrams block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The schematic flowchart diagrams and/or schematic block diagrams in the Figures illustrate the architecture, functionality, and operation of possible implementations of apparatuses, systems, methods and computer program products according to various embodiments of the present invention. In this regard, each block in the schematic flowchart diagrams and/or schematic block diagrams may represent a module, segment, or portion of code, which comprises one or more executable instructions for implementing the specified logical function(s).

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures.

Although various arrow types and line types may be employed in the flowchart and/or block diagrams, they are understood not to limit the scope of the corresponding embodiments. Indeed, some arrows or other connectors may be used to indicate only the logical flow of the depicted embodiment. For instance, an arrow may indicate a waiting or monitoring period of unspecified duration between enumerated steps of the depicted embodiment. It will also be noted that each block of the block diagrams and/or flowchart diagrams, and combinations of blocks in the block diagrams and/or flowchart diagrams, can be implemented by special purpose hardware-based systems that perform the specified functions or acts, or combinations of special purpose hardware and computer instructions.

Figure 1:
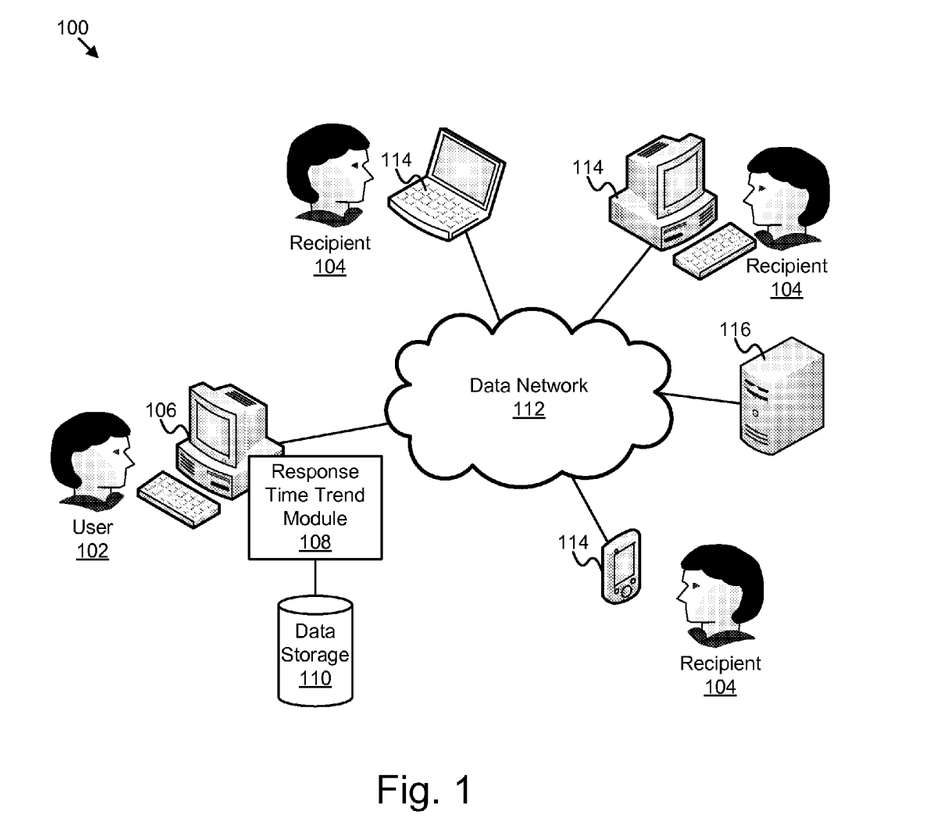
FIG. 1 is a schematic block diagram illustrating one embodiment of a system for displaying email messages based on response time trends in accordance with the present invention.

FIG. 1 depicts one embodiment of a system 100 for retaining and displaying email response time trends. In general, the system 100 determines and retains email response time trends of one or more recipients 104 for a user 102 and displays visual representations of the response time trends to the user 102. In the depicted embodiment, the system 100 comprises a user computing device 106, a response time trend module 108, a data storage repository 110, a data network 112, one or more recipient computing devices 114, an email server 116.

In one embodiment, the user 102 is an email user that sends email messages to and receives email messages from the one or more recipients 104. The user 102, in one embodiment, uses an email client application on the user computing device 106 to send and to receive email messages. The email client application may comprise a software application installed on the user computing device 106, a network or web application that is accessible to the user 102 on the user computing device 106, or another application that allows the user 102 to send and receive email messages. The user computing device 106 comprises a processor and a memory that store and execute program code. The computing device 106, for example, may comprise a desktop computer, a laptop computer, a cellular telephone, a personal digital assistant, a portable gaming or multimedia device, and the like.

To send and receive email messages, the user computing device is connected to the data network 112. The data network 112 may comprise a public or private, local or wide area, data network. In one embodiment, the data network 112 comprises the Internet. The email client application on the user computing device 106 may send and receive email messages through the email server 116, using the Simple Mail Transfer Protocol ("SMTP"), the Post Office Protocol ("POP"), the Internet Message Access Protocol ("IMAP"), or another email protocol. The email server 116 is connected to the data network 112, and is in communication with the user computing device 106. In one embodiment, the email server 116 may comprise a plurality of email servers that transfer email messages between the user 102 and the one or more recipients 104.

Each of the one or more recipients 104 may send and receive email messages using the recipient computing devices 114. In one embodiment, the recipient computing devices 114 each comprise a processor and a memory that store and execute program code. The recipient computing devices 114 may be substantially similar to the user computing device 106 described above. Each of the recipient computing devices 114 is connected to the data network 112, such that the recipient computing devices 114 can send and receive email messages through the email server 116 and/or other email servers.

In one embodiment, the response time trend module 108 determines response time trends for the one or more recipients 104. As used herein, recipient refers to either a single recipient or a group of recipients sharing a common attribute (i.e. all recipients of the marketing group). The response time trend module 108 may be integrated with, installed on, or otherwise in communication with the user computing device 106 and/or the email server 116. In one embodiment, the response time trend module 108 is integrated with the email client application that is installed on or accessible from the user computing device 106. The response time trend module 108 may determine response time trends of the one or more recipients 104 specifically for the user 102, or, in another embodiment, may determine response time trends of the one or more recipients 104 relative to a plurality of users 102. In one embodiment, the response time trend module 108 is local to the user computing device 106, and determines response time trends for the one or more recipients 104 relative to the user 102 based on email messages accessible to the user 102. In this manner, the response time trend module 108 can determine response time trends for the user 102 without extra interactions with or privacy intrusions on the one or more recipients 104.

A response time trend comprises a general tendency or course of behavior for a given recipient or group of recipients relating to an amount of time taken for one of or a group of the one or more recipients 104 to respond to an email message from the user 102. Example time information that defines a response time trend may include a minimum response time of a recipient, an average response time of a recipient, a maximum response time of a recipient, or the like.

A response time trend may be general, or may be specific to a predefined time or time period. For example, a response time trend may be specific to a time of day or a day of the week. A response time trend may also take schedule information of a recipient into account. A response time trend may also be specific to a content identifier for the sent and received email messages, such as a work email response time trend and a personal email response time trend.

"Content identifier," as used herein, means an identifier for an attribute of an associated email message. A content identifier may identify a principle subject matter of an associated email message, a type or number of attachments included in an associated email message, a priority level of an associated email message, one or more classifications of an associated email message, one or more user defined tags for an associated email message, or other attributes of an associated email message. In a further embodiment, a content identifier may be selected from a hierarchy of content identifiers, or the like. An email message may have a single content identifier, or may have a plurality of content identifiers. Content identifiers may be determined by the user 102, a recipient 104, or by the response time trend module 108. The response time trend module 108 is discussed in greater detail with regard to FIG. 2.

In one embodiment, the response time trend module 108 is in communication with the data storage repository 110. In one embodiment, the data storage repository 110 comprises non-volatile data storage, such as magnetic storage, optical storage, flash storage, and/or other types of data storage. The data storage repository 110 may be installed on or in communication with the user computing device 106, with the mail server 116, or may otherwise be in communication with the response time trend module 108. In one embodiment, the response time trend module 108 is in communication with the data storage repository 110 over the data network 112. In a further embodiment, the data storage repository 110 may comprise a data structure, or data storage software, such as a database, a data file, or the like.

The response time trend module 108, in one embodiment, may store response time trends on the data storage repository 110. The response time trend module 108 may store the response time trends in one or more mail files of the user 102, such as a mailbox file, individual email files, a configuration file, a metadata file, or the like, or in an independent data structure or file. The response time trend module 108, in another embodiment, may store other response time information, such as individual email response times, historical response time data, and the like on the data storage repository 110.

Figure 2:
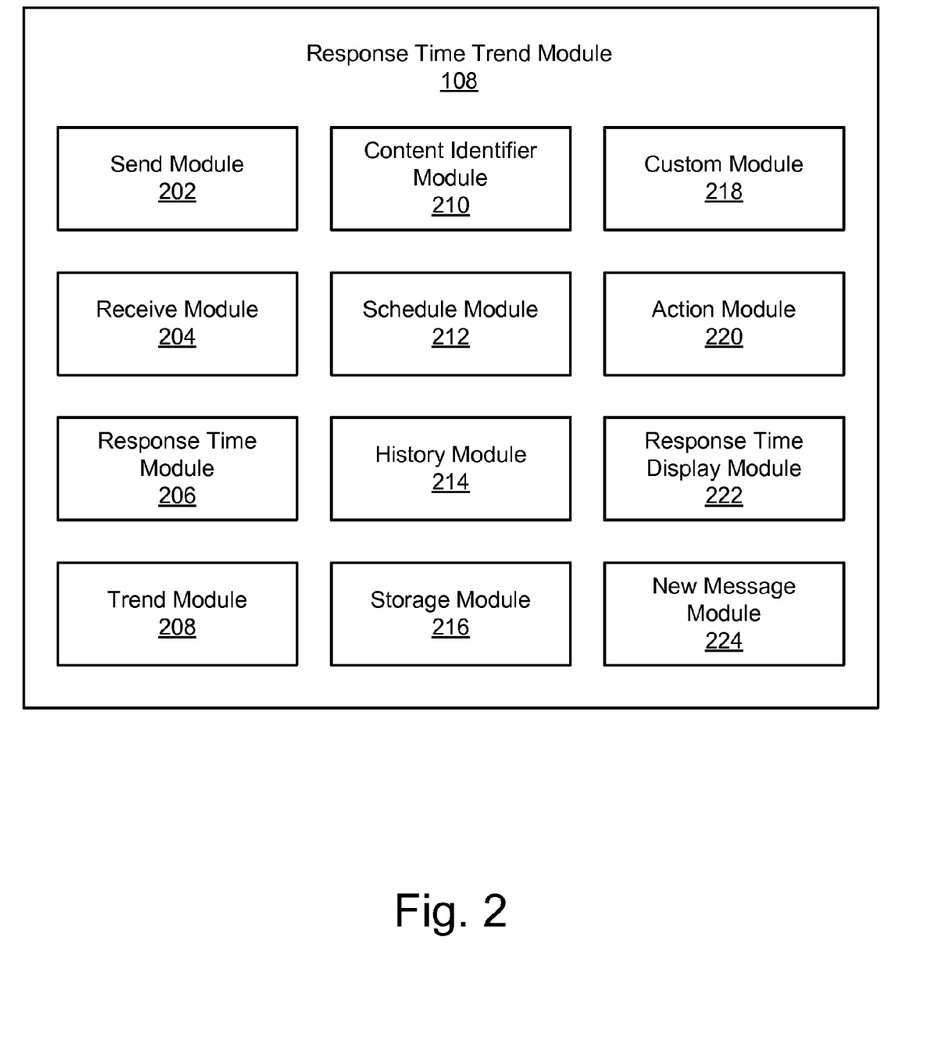
FIG. 2 is a schematic block diagram illustrating one embodiment of a response time trend module in accordance with the present invention.

FIG. 2 depicts one embodiment of the response time trend module 108. In the depicted embodiment, the response time trend module 108 comprises a send module 202, a receive module 204, a response time module 206, a trend module 208, a content identifier module 210, a schedule module 212, a history module 214, a storage module 216, a custom module 218, an action module 220, a response time display module 222, and a new message module 224.

In one embodiment, the send module 202 determines a time that the user 102 sends an email message to a recipient 104, or the send time of the email message. The send module 202 may determine the send time in response to the user 102 sending the email message, or may determine the send time that the user 102 previously sent the email message using email header data, metadata in a mail file, an archived copy of the email message, or the like.

In one embodiment, the receive module 204 determines a time that the user 102 receives a response to the email message from the recipient 104, or the receive time of the response. Like the send module 202, the receive module 204 may determine the receive time in response to the user 102 receiving the response to the email message, or may determine the receive time that the user 102 previously received the response using email header data, metadata in a mail file, an archived copy of the email message, or the like.

In a further embodiment, the receive module 204 determines that a received email message is a response to the previously sent email message, correlating the response and the email message. In one embodiment, the receive module 204 correlates the next email message from the recipient 104 to the sender with the previously sent email message. In another embodiment, the receive module 204 may use one or more identifiers, such as a 'Message-ID' or 'In-Reply-To' header field or the like, a subject field, a matching recipient/sender, a matching content identifier for the email messages, and the like to correlate a response message with the email message.

In one embodiment, the content identifier module 210 described below determines a content identifier for the sent message and for the received email message. In a further embodiment, the receive module 204 uses the content identifier for a received email message and one or more additional aspects of the received email message to determine that the received email is a response to the previously sent email message even if a 'Message-ID,' a sender's email address, a subject field, or the like does not match. In this manner, the response time trend module 108 can determine a reliable response time trend, even when a response is sent by the recipient 104 from a different email account, is not a direct reply, does not share a common subject field, or the like.

In one embodiment, the receive module 204 may determine that certain predefined types of emails are not valid responses. For example, in one embodiment, the receive module 204 may recognize a received email as a delivery receipt, a read receipt, an auto-reply, an out-of-office reply, an automated message, or the like, and may determine that the received email is not a valid response to the email message. As described below, in one embodiment, the schedule module 212 may adjust a response time trend based on a received email, even if the received email is not a valid response to the email message, for greater accuracy in determining response time trends. In a further embodiment, the schedule module 212 may adjust a response time trend by excluding response time information from the response time trend in response to receiving an out-of-office reply, or the like, such that the response time trend is not improperly skewed by an abnormally long response time.

In one embodiment, the response time module 206 determines a response time corresponding to the email message. The response time module 206 bases the response time on an elapsed time or difference in time between the send time that the send module 202 determines and the receive time that the receive module 204 determines. The response time, in one embodiment, is specific to the email message, the user 102, and the recipient 104. In a further embodiment, the response time is also specific to a content identifier that the content identifier module 210 determines for the email message. The response time module 206 may mark, flag, or otherwise identify the response time as corresponding to the user 102, the recipient 104, and/or the content identifier.

In one embodiment, the trend module 208 uses the response time that the response time module 206 determines to determine a response time trend that corresponds to the recipient 104. In another embodiment, the response time trend also corresponds to a determined content identifier for the email message. The trend module 208 may also use a plurality of previous response times of the recipient, determined based on a plurality of previous email messages between the user 102 and the recipient 104. In one embodiment, the plurality of previous email messages that the trend module 208 uses to determine the response time trend match the determined content identifier for the email message.

A response time trend comprises historical response time information corresponding to the recipient 104. In one embodiment, a response time trend may comprise discrete values, such as a minimum response time, an average response time, a maximum response time, and the like. An average response time may comprise a mean, a median, a mode, or another average-type representation of historical response times of the recipient 104. In another embodiment, the response time trend may comprise an equation, function, graph, map, table, or the like of historical response times, or of average response times.

The trend module 208, in one embodiment, may determine separate response time trends for various time periods, such as each day of the week, or the like. In a further embodiment, response time trends may be based on or indexed by send times of email messages from the user 102 to the recipient 104. A response time trend may further comprise an intraday response time trend, representing response time trends of the recipient 104 throughout an individual day. In another embodiment, the trend module 208 may determine response time trends based on other factors, such as trends for the most recent week, month, year, or the like, a received time of a read receipt, a number of recipients, a length of the email message, a priority or urgency level of the email message, and the like.

For example, in one embodiment, a response time trend for the recipient 104 may comprise a data structure, such as a table, an array, a list, or the like, that holds various response time values for discrete periods of time, such as a minimum, average, and maximum response time for every day, every hour, every fifteen minutes, or the like. A response time trend may comprise a plurality of data structures, for example, one for each day of the week, for each hour, for each content identifier, or the like. Response time trends, in another embodiment, may be marked, tagged, indexed, or otherwise identified by a corresponding recipient, content identifier, time period, send time, receive time, and/or other characteristic to increase the accessibility and usability of the response time trends.

In one embodiment, a response time trend relates to email communication between the user 102 and the recipient 104. In a further embodiment, a response time trend may relate to email communications between a plurality of users and the recipient 104, or to email communications between the user 102 and a plurality of recipients 104. A response time trend, in another embodiment, may relate to email communications between a plurality of users and a plurality of recipients based on a separate factor, such as a content identifier for email messages, a classification of user or recipient, a time period, send times, receive times, and the like.

In one embodiment, the content identifier module 210 determines a content identifier for the email message. A content identifier is an identifier that represents an attribute of the email message. The content identifier may originate from or include terms or phrases from the subject line or body of the email message or comprise an identifier representative of an attribute of the email message such as a principle subject matter for the email message, a type or number of attachments included in the email message, a priority level of the email message, a classification of the email message, a user defined tag for the email message, or another attribute of the email message. As an identifier, a content identifier may comprise a tag or category assigned to the email message, one or more words or phrases parsed from the email message, a characteristic of the email message, or the like. Content identifiers may be arranged in a hierarchy, with sub-content identifiers having greater specificity than parent content identifiers. The content identifier module 210 may determine a content identifier for the email message and for a received email to assist the receive module 204 in determining that the received email is a response to the email message.

In one embodiment, a user, such as the user 102 or the recipient 104, determines a content identifier for the sent email message. The content identifier module 210, in one embodiment, may provide the user a list of content identifiers, and the user may select one or more of the content identifiers for the email message. In another embodiment, a user may input one or more content identifiers for the email message, for example by entering the content identifiers into a content tagging interface or the like that the content identifier module 210 presents to the user. The user 102, in one embodiment, may provide the content identifier for the sent email message during composition of the sent email message. In another embodiment, the recipient 104 may provide the content identifier for the sent email message during composition of a response to the sent email message.

In a further embodiment, the content identifier module 210 parses content from the email message to determine a content identifier for the email message. The content identifier module 210 may search or scan the email message for one or more predefined words or phrases, may count or index words found in the email message, or may otherwise parse content from the email message such that the content identifier module 210 can compare parsed content from the email message with content from previous email messages to determine the content identifier. The content identifier module 210, in a further embodiment, may use a specific portion of the email message, such as the subject line, a signature, or the like, to determine a content identifier for the email message.

In one embodiment, the content identifier module 210 may base the content identifier on a subject matter of the email message as recited in the subject field of the email message or parsed from the body of the email message. In another embodiment, the content identifier module 210 may base the content identifier on another attribute of the email message, such as a number or type of attachments, an email type, such as forward, reply, or new, a length of the email message, or on other attributes. In one example embodiment, the content identifier module 210 may determine that email messages with words like "lunch," "movie," "game," "vacation," and the like have a "personal" content identifier, while email messages with words like "deadline," "report," "meeting," "draft," and the like have a "work" content identifier. In a further embodiment, the content identifier module 210 may select one or more words or phrases from an email message as a content identifier for the email message. In another embodiment, the content identifier module 210 may determine multiple content identifiers for a single email message.

The content identifier module 210, in a further embodiment, may determine the content identifier based on metadata associated with the recipient 104. For example, in one embodiment, the content identifier module 210 may maintain or access metadata defining certain recipients as "work" contacts, others as "family" contacts, and others as "friend" contacts, or the like, and may determine the content identifier based on the metadata. The content identifier module 210 may access recipient metadata in an address book, a directory, in emails to or from a recipient, in a mail file, or in another location accessible to the content identifier module 210.

In one embodiment, the trend module 208 determines response time trends based on content identifier. For example, the trend module 208 may determine a plurality of response time trends for a single recipient 104, based on a plurality of response times that the content identifier module 210 identifies in responses from the recipient 104. In that manner, if the recipient 104 tends to respond more quickly to email messages of a particular content identifier, and less quickly to email messages of another, the trend module 208 will accurately represent that fact in separate response time trends for each content identifier, both separate response time trends corresponding to the same recipient 104.

In one embodiment, the schedule module 212 adjusts the response time trend that the trend module 208 determines based on schedule information of the recipient 104. Schedule information comprises data that indicates a past, present, or future availability or unavailability of the recipient 104. Schedule information, in one embodiment, may comprise a time zone of the recipient 104, calendar items of the recipient 104, a location of the recipient 104, or other information relating to the availability or responsiveness of the recipient 104. Examples of calendar items, in one embodiment, include meetings, appointments, holidays, vacations, meals, breaks, trips, work hours, and the like. The schedule module 212, in one embodiment, retrieves schedule information of the recipient 104 from a shared calendar over the data network 112. In another embodiment, the schedule module 212 discovers schedule information using a content analysis of an email message. For example, the schedule module 212, in one embodiment, may parse schedule information from an "out of office" email response, a meeting request email, a flight itinerary email, an event invitation email, and the like.

Adjusting the response time trend may comprise altering the response time trend, adding information to the response time trend, removing a response time from the response time trend, or otherwise adjusting the response time trend based on schedule information. For example, the schedule module 212, in one embodiment, may adjust a response time trend to reflect an event that that the recipient 104 has scheduled, may add information about the event to the response time trend, may make a copy of the response time trend and adjust the copy to reflect the event, or the like. In a further embodiment, the schedule module 212 may adjust a response time trend by excluding one or more response times from the response time trend in response to schedule information, such that the response time trend is not improperly skewed by an abnormally long response time relating to the schedule information.

In one embodiment, the history module 214 updates the response time trend based on one or more stored email messages sent to the recipient 104 and on one or more corresponding stored response messages from the recipient 104. The stored emails may comprise archived emails, imported emails, or other previously sent emails that are accessible to the history module 214. In one embodiment, the stored email messages comprise emails sent from the user 102 to the recipient 104. In another embodiment, the stored email messages comprise email messages having a certain content identifier, email messages from a certain classification or group of senders, or another related group of email messages.

By updating the response time trend based on stored email messages, the history module 214 increases the accuracy of the response time trend for the recipient 104 without waiting for additional future correspondence. In one embodiment, the send module 202, the receive module 204, the response time module 206, the trend module 208, and/or the content identifier module 210 assist the history module 214 in updating the response time trend, substantially as described above.

In one embodiment, the storage module 216 stores the response time trend in the data storage repository 110. In a further embodiment, the storage module 216 stores response time data corresponding to the email message in the data storage repository 110. Response time data corresponding to the email message, in one embodiment, may comprise the send time of the email message, the receive time of the email message, the response time of the recipient 104, and/or other data associated with the email message and the response.

The storage module 216, in one embodiment, may store the response time trend and/or the response time data in a manner such that the information is accessible using a recipient, content identifier, time period, send time, receive time, and/or other characteristic as an identifier or key. For example, the storage module 216 may store the response time trend and/or the response time data in a database or data structure that is indexed or keyed by one or more characteristics.

In one embodiment, the custom module 218 determines a custom response time trend based on the response time data that the storage module 216 stores. The custom response time trend, in one embodiment, is defined by a user, such as the user 102. The custom module 218, in one embodiment, may allow custom access to response time data, providing more specific trends than those that the trend module 208 determines. For example, the custom module 218, in one embodiment, may search, scan, or query response time data to determine a custom response time trend based on user-selected parameters, such as send time, receive time, sender, content identifier, number of recipients, attachments, message priority, and the like. The custom module 218 may present the custom response time trend to the user 102, may store the custom response time trend, may adjust a response time trend based on the custom response time trend, or may perform another action with the custom response time trend.

In one embodiment, the action module 220 suggests an action to the user 102 relative to the recipient 104 based on the response time trend corresponding to the recipient 104. The action may comprise a suggested time for the user 102 to make additional contact with the recipient 104, a suggested method of contact for the user 102 to use to contact the recipient 104, such as email, telephone, or instant message contact, or the like. For example, in one embodiment, the action module 220 may suggest that the user 102 wait before sending an additional email to the recipient 104, until after a minimum, average, or maximum response time of the recipient 104 has passed, or may suggest that the user 102 contact the recipient 104 once a minimum, average, or maximum response time of the recipient 104 has passed.

In one embodiment, the response time display module 222 displays a set of email messages to the user 102 and displays a visual representation of a plurality of response time trends corresponding to a sender or recipient of the email messages. The response time display module 222 displays the visual representations such that each visual representation is visually associated with at least one of the email messages. A visual representation of a response time trend, in one embodiment, may comprise a color representing the response time trend, a number representing a minimum, average, maximum, or estimated response time, a graph, an icon, a marking on or around the email message, such as a highlighting, underlining, bolding, or italicizing the email message in the set, or another visual representation. Different representations may be given different meanings. For example, in an embodiment where colors are used as a visual representation, green may be defined as representing a low range of response time trends, yellow a middle range, and red a high range.

In one embodiment, the response time display module 222 displays a set of emails received by the user 102, and displays a visual representation for each email in the set representing a response time trend of the sender of the email. This allows the user 102, optionally, to reciprocate or prioritize responses to received emails based on the response time trends of the received emails' senders. In another embodiment, the response time display module 222 displays a set of email sent by the user 102, and displays a visual representation of an estimated response time for each sent email in the set, based on response time trends of the recipients.

In one embodiment, the new message module 224 assists the user 102 in composing a new email message and dynamically determines an estimated response time for the new email message. The estimated response time, in one embodiment, is based on response time trends of recipients of the new email message. The new message module 224, in a further embodiment, dynamically updates the estimated response time as the user 102 adds or removes recipients, and may suggest additional recipients based on a content identifier for the new messages, based on other recipients, or based on reducing the estimated response time for the new email message.

Figure 3:
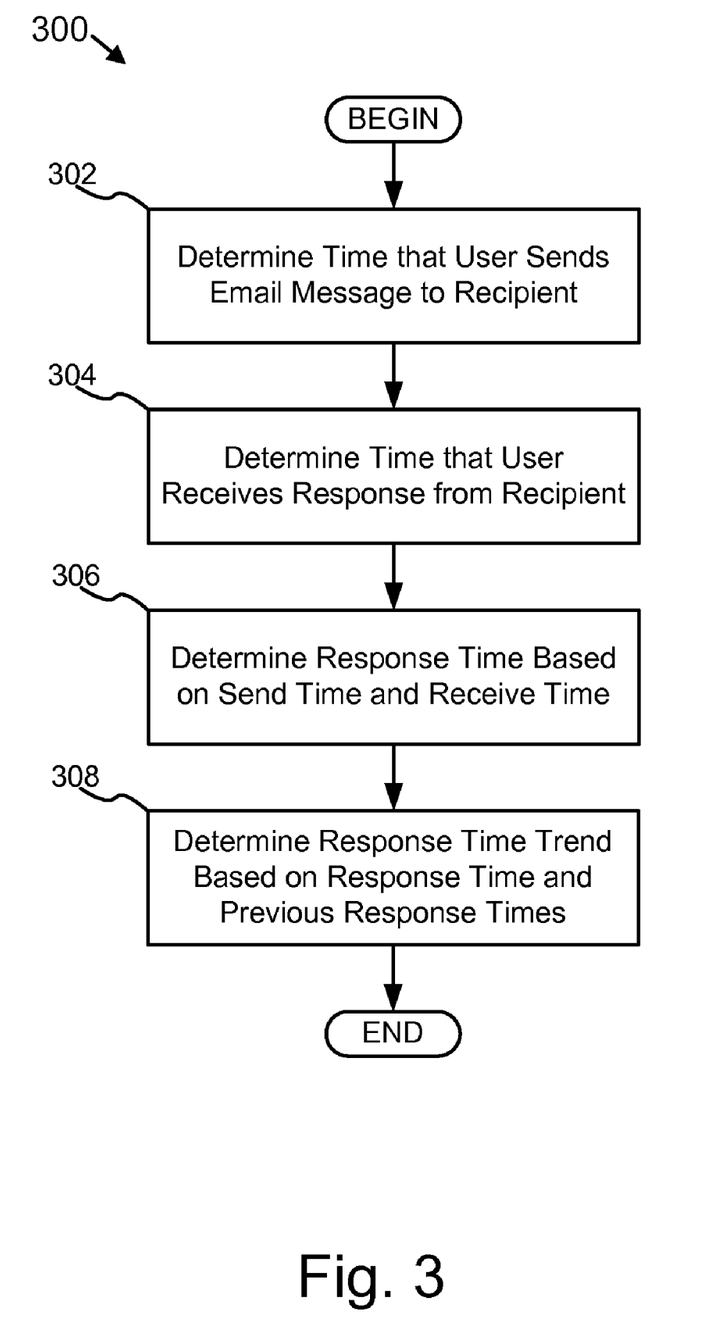
FIG. 3 is a schematic flow chart diagram illustrating one embodiment of a method for determining email response time trends in accordance with the present invention.

FIG. 3 depicts one embodiment of a method 300 for determining email response time trends. The method 300 begins, and the send module 202 determines 302 a send time for an email message that the user 102 sends to a recipient 104. The receive module 204 determines 304 a receive time for a response that the user 102 receives to the email message from the recipient 104.

The response time module 206 determines 306 a response time for the email message based on an amount of time that elapses between the send time and the receive time. The trend module 208 determines 308 a response time trend for the recipient 104 based on the response time and on previous response times of the recipient 104, and the method 300 ends.

Figure 4:
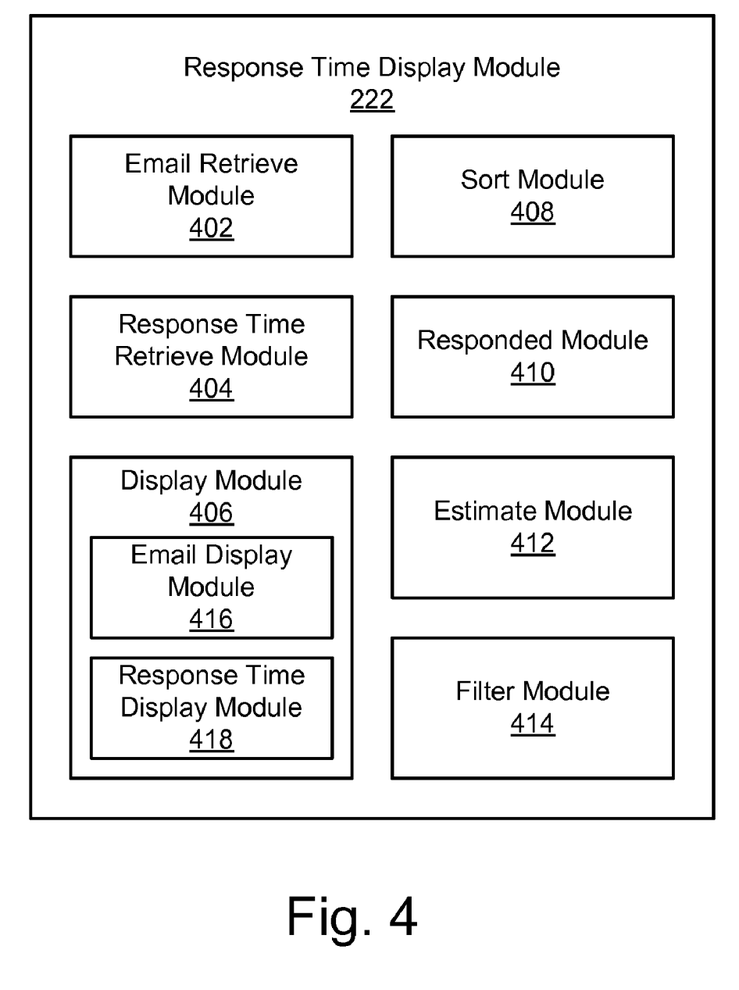
FIG. 4 is a schematic block diagram illustrating one embodiment of a response time display module in accordance with the present invention.

FIG. 4 depicts one embodiment of the response time display module 222. As described above, in general, the response time display module 222 displays a set of email messages with a visual representation of a response time trend for each of the email messages. In the depicted embodiment, the response time display module 222 comprises an email identification module 402, a response time identification module 404, a display module 406, a sort module 408, a responded module 410, an estimate module 412, and a filter module 414.

In one embodiment, the email identification module 402 identifies a set of email messages for the user 102. The set of email messages may each have a common characteristic, such as emails in an inbox of the user 102, emails sent by the user 102, emails having a common subject matter, and the like. The email identification module 402 may identify the set of email messages from email messages stored on a data storage repository, such as the data storage repository 110, from an email server, such as the email server 116, from another module, from the data network 112, or elsewhere.

In one embodiment, the set of emails comprises a set of sent email messages, such as email messages that the user 102 has sent to the one or more recipients 104. In another embodiment, the set of emails comprises email messages that the user 102 has received from the one or more recipients 104. In one embodiment, the email identification module 402 identifies the set of email messages in response to a request from the user 102, such as a selection of an email folder by the user 102, interaction by the user 102 with a graphical element, or the like.

In one embodiment, the response time identification module 404 determines one or more response time trends. The response time identification module 404 may determine the one or more response time trends for the set of email messages that the email identification module 402 retrieves. As described above, a response time trend may comprise historical response time information, an estimated response time, discrete response time values, such as minimum response time, average response time, and maximum response time, may be specific to a predefined time period, may be adjusted for schedule information, and the like.

The response time identification module 404, in one embodiment, may determine a response time trend for each sender of an email message in the set of email messages. In certain embodiments, the response time identification module 404 may be substantially similar to the response time module 206 described above, and may determine response time trends in a similar manner. In a further embodiment, the response time identification module 404 may retrieve stored response time trends, as described below.

In one embodiment, the response time identification module 404 may determine a response time trend for each recipient of an email message in the set of email messages. For example, if the set of email messages comprises email messages sent by the user 102, the response time identification module 404 may determine a response time trend for each recipient, or, if the set of email messages comprises email messages received by the user 102, the response time identification module 404 may determine a response time trend for each sender.

The response time identification module 404, in one embodiment, determines the response time trends by accessing stored response time trends. In one embodiment, the response time identification module 404 accesses response time trends corresponding to the one or more recipients 104 that the storage module 216 stores on the data storage repository 110. In a further embodiment, the response time identification module 404 may receive response time trends from an email server, such as the email server 116, from another module, such as the trend module 208, from a data network, such as the data network 112, from a response time trend service provider, or the like.

In another embodiment, the response time identification module 404 determines the response time trends based on response times of the one or more recipients 104, as described above with regard to the response time trend module 108. The response time identification module 404 may comprise or otherwise be in communication with one or more of the send module 202, the receive module 204, the response time module 206, and the trend module 208 to determine the response time trends, as described above.

In one embodiment, the display module 406 displays the set of email messages and visual representations of the response time trends to the user 102. The display module 406 may display the set of email messages and visual representations to the user using an electronic display device, or the like, that is capable of displaying text and/or graphics, such as a display coupled to or in communication with the user computing device 106.

In the depicted embodiment, the display module 406 comprises an email display module 416 and a response time display module 418. In one embodiment, the email display module 416 displays the set of email messages to the user 102. The email display module 416 may display the set of email messages as a list of summary information, such as sender, recipient, date, time, subject, priority, status, and/or other information related to each email message in the set. Another embodiment of a graphical display of the email set is described in greater detail with regard to FIG. 5A and FIG. 5B.

The response time display module 418, in one embodiment, displays the visual representations of the response time trends to the user 102. The response time display module 418 may display the visual representations as part of the same graphical display as the set of email messages that the email display module 416 displays. In one embodiment, the visual representations each visually represent an aspect of a response time trend. For example, in one embodiment, each visual representation may represent an average response time, a minimum response time, a maximum response time, an expected response time, or the like.

In a further embodiment, the response time display module 418 displays the visual representations such that each visual representation of a response time trend is visually associated with a corresponding email message from the set of email messages in a graphical display. A visual representation, in one embodiment, is visually associated with an email message based on a visual or special relationship between the two. For example, a visual representation may be in line with an email message, may have a similar color as an email message, may comprise a marking on or around an email message, or the like.

As described above, a visual representation, in one embodiment, may comprise a color representing the response time trend, a number representing a minimum, average, maximum, expected, or estimated response time, a graph, an icon, a marking on or around the email message, such as a highlighting, underlining, bolding, or italicizing the email message in the set, or another visual representation. Different representations may be given different meanings. For example, in an embodiment where colors are used as a visual representation, green may be defined as representing a low range of response time trends, yellow a middle range, and red a high range.

In one embodiment, the set of email messages comprises email messages sent by the user 102, and the visual representations each represent an expected response time estimated by the estimate module 412. In another embodiment, the set of email messages comprises email messages received by the user 102, and the visual representations each represent a response time trend of a sender of an email message, allowing the user 102, optionally, to reciprocate or prioritize responses to the received email messages based on the response time trends of the received emails' senders.

In one embodiment, the response time display module 418 dynamically updates one or more of the visual representations. For example, in one embodiment, the response time display module 418 may update a visual representation in response to an update to the corresponding response time trend, updated schedule information from the schedule module 212, an amount of time having elapsed, the user 102 responding to or receiving a response to the corresponding email message in the set, or the like. The response time display module 418, in one embodiment, may update one or more individual visual representations dynamically, or, in another embodiment, may update an entire graphical display.

In one embodiment, the sort module 408 sorts the set of email messages based on the response time trends. The sort module 408, in another embodiment, sorts the set of email messages in sequential order from a shortest response time to a longest response time. The sort module 408 may place email messages corresponding to shorter response times at a beginning of the set, at an end of the set, may alternate between beginning and end placement, or the like. The sort module 408 may sort the set of email messages prior to the email display module 416 displaying them, or may dynamically sort displayed email messages. In one embodiment, the sort module 408 may sort the set of emails in response to user input, for example in response to a selection by the user 102 of a sort element or the like in a graphical display.

In one embodiment, the responded module 410 places an email message toward an end of the displayed set of email messages based on a response to the email message. A response to the email message may comprise a response sent by the user 102, a response received by the user 102, or the like. For example, in one embodiment, if the set of email messages comprises email messages received by the user 102, response time trends of a sender may not be relevant once the user 102 has responded to an email message, and the responded module 410 may place the email message toward an end of the displayed set of email messages. In another embodiment, the responded module 410 may place an email message toward an end of a displayed set of email messages sent by the user 102 upon receiving a response to the sent email message.

In one embodiment, the responded module 410 places the email message toward an end of the displayed set of email messages in coordination with a sort by the sort module 408. In another embodiment, the responded module 410 places the email message toward an end of the displayed set of email messages dynamically upon the user 102 responding to or receiving a response to the email message.

In one embodiment, the estimate module 412 determines an expected response time for a sent email message in the set of email messages based on one or more response time trends of one or more recipients of the sent email message. An expected response time, in one embodiment, is an amount of time in which the user is likely to receive a response to the sent email message. While a response time trend indicates a general tendency of a recipient to respond to an email message over time, an expected response time is specific to a specific sent email message.

The estimate module 412, in one embodiment, may determine the expected response time based on an average response time of the one or more recipients, a minimum response time of the one or more recipients, a maximum response time of the one or more recipients, on other information from the one or more response time trends, or on other information external to the one or more response time trends. The estimate module 412, for example, may determine the expected response time based on a time of day, a day of the week, a content identifier, schedule information, or the like relative to the one or more response time trends. In a further embodiment, the estimate module 412 may determine an expected response time for each of a plurality of recipients of the sent email message.

In a further embodiment, the estimate module 412 adjusts the expected response time based on schedule information for a recipient of a sent email message, substantially as described with regard to the schedule module 212. As described above, schedule information may comprise a timezone, calendar items, and the like. The estimate module 412, in another embodiment, may dynamically update one or more of the displayed visual representations based on the schedule information. For example, in one embodiment, the estimate module 412 may add a representation of the schedule information to a visual representation, may update a visual representation to reflect an adjusted expected response time, or the like.

In one embodiment, a visual representation that corresponds to a sent email message represents the expected response time that the estimate module 412 determines. A visual representation may represent an expected response time, as described above, by displaying an amount of time, an expected time, a color, a shape, an icon, or the like that represents the expected response time. In a further embodiment, a visual representation may be dynamically updated, animated, or the like over time based on the expected response time. For example, a visual representation may count down to the expected response time, may represent that a response is past due, or the like.

In one embodiment, the filter module 414 filters an email message from the set of email messages if the user 102 does not expect a response to the email message. The filter module 414, in one embodiment, may filter one or more email messages based on input from the user 102. The user 102 may indicate to the filter module 414 that the user 102 does not expect a response to an email message during composition of the email message, by selecting one or more email messages from the set, by editing a flag or other setting, or the like. In one embodiment, the filter module 414 may filter an email message from the set by removing or excluding the email message from the set. In a further embodiment, the filter module 414 may filter an email message from the set by placing the email message toward an end of the set, as described relative to the responded module 410, or performing another action relative to the email message.

Figure 5A:
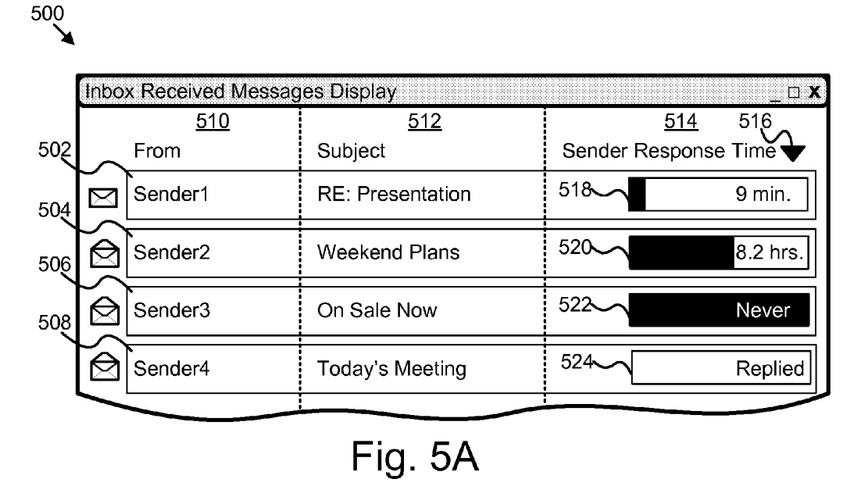
FIG. 5A is a schematic block diagram illustrating one embodiment of a graphical display for displaying received email messages based on response time trends in accordance with the present invention.

FIG. 5A depicts one embodiment of a graphical display 500 for displaying received email messages based on response time trends. In one embodiment, the graphical display 500 is displayed to the user 102 by the display module 406, as described above. The graphical display 500 comprises a set of email messages. The set of email messages, in the depicted embodiment, comprises a Sender1 message 502, a Sender2 message 504, a Sender3 message 506, and a Sender4 message 508. Each of the email messages 502, 504, 506, 508 comprises a sender field 510, a subject field 512, and a response time trend field 514. The graphical display 500, in another embodiment, may display one or more additional fields, such as a date and/or time field, an email body field, a priority field, and the like.

In the depicted embodiment, the graphical display 500 further comprises a sort element 516. The sort element 516, in one embodiment, comprises a graphical tool allowing the user 102 to signal the sort module 408 to sort the email messages 502, 504, 506, 508 based on response time trends associated with the email messages 502, 504, 506, 508. In the depicted embodiment, the sort module 408 has sorted the email messages 502, 504, 506, 508 in sequential order from a shortest response time to a longest response time.

The response time trend field 514 for each of the email messages 502, 504, 506, 508 comprises a visual representation 518, 520, 522, 524, representing a response time trend of the sender 510 of each email message 502, 504, 506, 508. Each of the depicted visual representations 518, 520, 522, 524 may comprise a graphical representation and/or an alphanumeric representation of a response time trend. The response time trend field 514 provides the user 102 with the visual representations 518, 520, 522, 524 representing historic response time trends for each sender 510. The user 102 may choose to reciprocate, by responding first to a sender 510 who has historically responded quickly to the user 102.

The Sender1 visual representation 518 represents a response time trend of 9 minutes, which may comprise an average response time, a minimum response time, a maximum response time, an estimated response time, or the like of Sender1. Similarly, the Sender2 visual representation 520 represents a response time trend of 8.2 hours. The Sender3 visual representation 522 represents a response time trend of Sender3, who has never responded to an email from the user, and has a response time trend of never. In the depicted embodiment, the Sender4 visual representation 524 represents that the user 102 has already responded to the email message 508 from Sender4, and the responded module 410 has placed the email message 508 toward an end of the set of emails.

Based on the visual representations 518, 520, 522, 524, if the user 102 desires to reciprocate, the user 102 may choose to respond first to the Sender1 message 502, because the response time trend 518 of 9 minutes is the lowest response time trend 514. This user 102 may respond first as a courtesy, to encourage future quick responses, or the short response time trend 518 may indicate an urgency of emails between the user 102 and Sender1, or the like.

In one embodiment, each of the visual representation 518, 520, 522, 524 represent a response time trend of the senders 510 that is specific to a content identifier, as described above relative to the content identifier module 210. For example, in the depicted embodiment, the subject field 512 indicates that the Sender1 email message 502 and the Sender4 email message 508 may have a work related content identifier, while the Sender2 email message 504 and the Sender3 email message 506 may have a personal content identifier, or the like. As described above, a content identifier may be defined by the user 102, parsed from email contents, or the like. In a further embodiment, a visual representation of a response time trend may further comprise an identifier that represents a content identifier, indicating to the user 102 that the visual representation is specific to the identified content identifier. For example, a visual representation may comprise a label, tag, icon, or other identifier indicating that the visual representation is for a "work" content identifier response time trend or a "personal" content identifier response time trend.

Figure 5B:
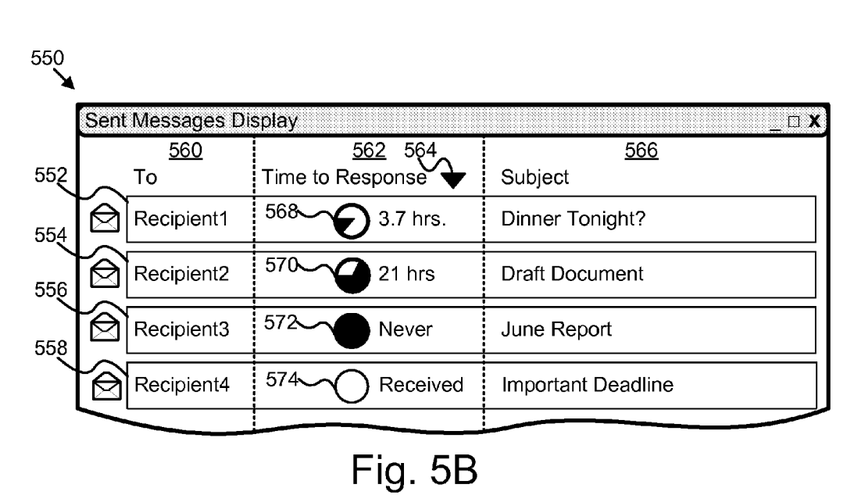
FIG. 5B is a schematic block diagram illustrating one embodiment of a graphical display for displaying sent email messages based on response time trends in accordance with the present invention.

FIG. 5B depicts one embodiment of a graphical display 550 for displaying sent email messages based on response time trends. In one embodiment, the graphical display 550 is substantially similar to the graphical display 500 of FIG. 5A, displaying a set of sent email messages instead of a set of received email messages.

The set of email messages, in the depicted embodiment, comprises a Recipient1 message 552, a Recipient2 message 554, a Recipient3 message 556, and a Recipient4 message 558. Each of the email messages 552, 554, 556, 558 comprises a recipient field 560, a response time trend field 562, and a subject field 564. The graphical display 550, in another embodiment, may display one or more additional fields, such as a sent date and/or time field, an email body field, a priority field, and the like.

In the depicted embodiment, the graphical display 550 further comprises a sort element 564 that is substantially similar to the sort element 516 described above. The sort element 564, in one embodiment, comprises a graphical tool allowing the user 102 to signal the sort module 408 to sort the email messages 552, 554, 556, 558 based on response time trends associated with the email messages 552, 554, 556, 558. In the depicted embodiment, the sort module 408 has sorted the email messages 552, 554, 556, 558 in sequential order from a shortest response time to a longest response time.

The response time trend field 562 for each of the email messages 552, 554, 556, 558 comprises a visual representation 568, 570, 572, 574, representing a response time trend of the recipient 560 of each email message 552, 554, 556, 558. In one embodiment, the visual representations 568, 570, 572, 574 represent an expected response time that the estimate module 412 estimates for each email message 552, 554, 556, 558.

While the visual representations 514 of FIG. 5A represent historic response time trends of the senders 510, the expected response times that the visual representations 568, 570, 572, 574 represent are estimates of future expected responses from the recipients 560 based on past response time trends. The visual representations 514 of FIG. 5A may encourage reciprocity, indicate urgency, or the like, and the visual representations 566 estimate the receipt of response emails, as described above with regard to the estimate module 412.

Each of the depicted visual representations 568, 570, 572, 574 may comprise a graphical representation and/or an alphanumeric representation of a response time trend. The Recipient1 visual representation 568 represents a response time trend, or expected response time, of 3.7 hours. This means that based on a historic response time for Recipient 1, the user 102 can expect to receive a response in about 3.7 hours. Similarly, the Recipient2 visual representation 570 represents a response time trend of 21 hours. The Recipient3 visual representation 572 represents a response time trend of Recipient3, who has never responded, and has a response time trend of never. In the depicted embodiment, the Recipient4 visual representation 574 represents that the user 102 has already received a response to the email message 558.

Figure 6:
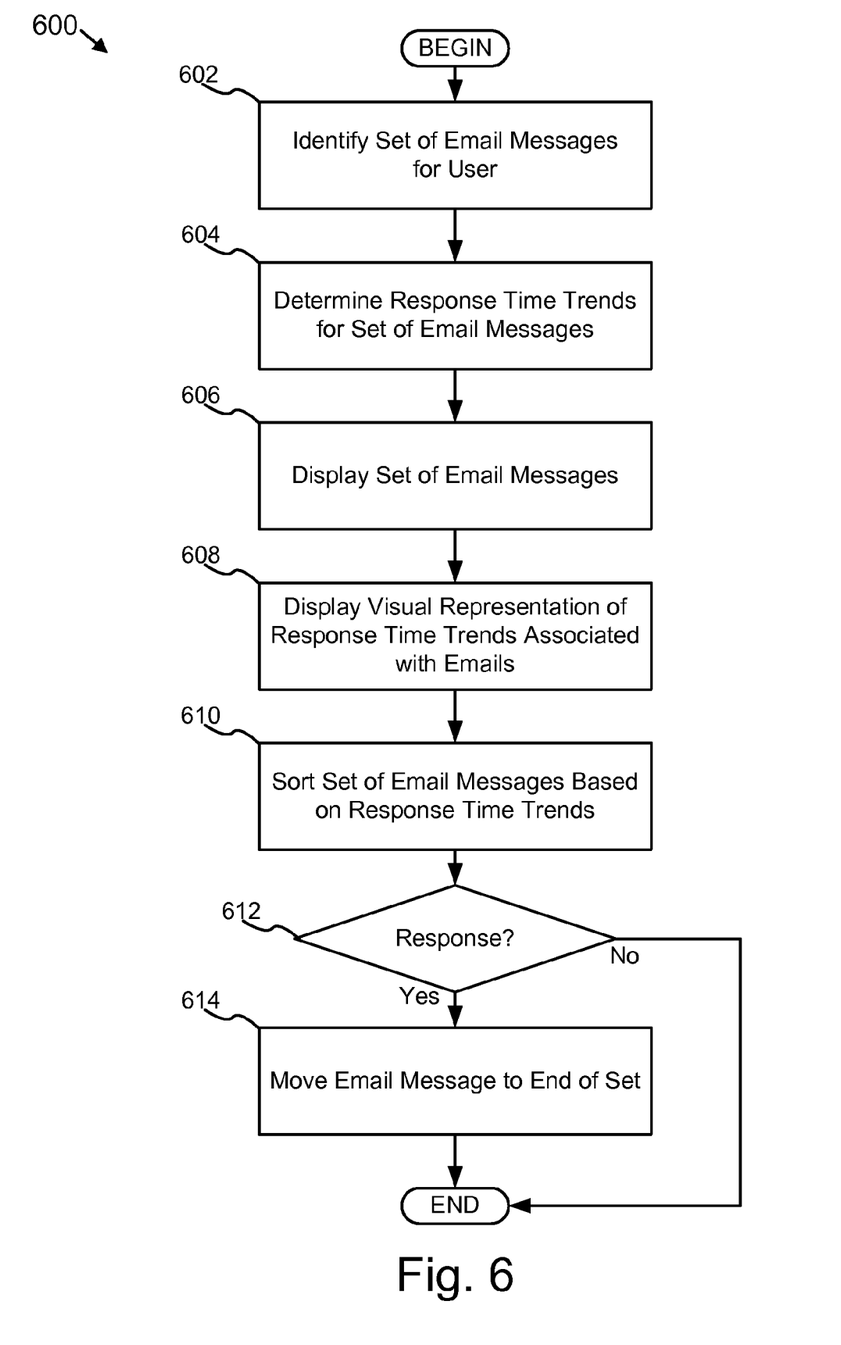
FIG. 6 is a schematic flow chart diagram illustrating one embodiment of a method for displaying email messages based on response time trends in accordance with the present invention.

FIG. 6 depicts one embodiment of a method 600 for displaying email messages based on response time trends. The method begins, and the email identification module 402 identifies 602 a set of email messages for the user 102. The response time identification module 404 determines 604 a plurality of response time trends corresponding to email messages in the set. A response time trend may correspond to an email message based on a sender of the email message, a recipient of the email message, a content identifier for the email message, or the like.

The email display module 416 displays the set of email messages to the user 102. The response time display module 418 displays 608 visual representations of the plurality of response time trends to the user 102. The response time display module 418 displays 608 the visual representations such that each visual representation is visually associated with at least one corresponding email message that the email display module 416 displays 606. The sort module 408 sorts 610 the set of email messages based on the plurality of response time trends.

The responded module 410 determines 612 whether or not the user 102 has sent or received a response to an email message from the set of email messages. If the responded module 410 determines 612 that the user 102 has sent or received a response to an email message, the response module 410 moves 614 the email message toward an end of the set of email messages, and the method 600 ends. If the responded module 410 determines 612 that the user 102 has not yet sent or received a response to an email message, the method 600 ends.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:
   identifying a set of email messages for a user;
   determining one or more response time trends, each response time trend corresponding to at least one email message in the set of email messages;
   creating for display, a visual representation of each response time trend to the user such that each visual representation of a response time trend is visually associated with the at least one corresponding email message in the set of email messages, wherein the visual representation and corresponding response time trend are selected for association with one of the email messages based on a content identifier for the email message, the visual representation comprising an identifier representing the content identifier;
   sorting the set of email messages in sequential order from a shortest response time to a longest response time based on the one or more response time trends;
   updating, dynamically, one or more of the displayed visual representations based on the schedule information; and
   placing an email message toward an end of the displayed set of email messages based on an email response to the email message.

2. The method of claim 1, wherein determining the one or more response time trends comprises,
   determining a plurality of response times corresponding to one of a sender and a recipient for one or more email messages in the set, each response time based on an elapsed time between a send time that the user sends an email message and a receive time that the user receives a response email to the email message; and
   determining the one or more response time trends based on the plurality of response times and associating each response time trend with at least one email message in the set based on the corresponding one of a sender and a recipient.

3. The method of claim 1, wherein the set of email messages comprises email messages received by the user.

4. The method of claim 1, wherein the set of email messages comprises a set of sent email messages sent by the user.

5. The method of claim 4, further comprising determining an expected response time for a sent email message based on a response time trend corresponding to a recipient of the sent email message, the expected response time comprising an amount of time in which the user is likely to receive a response to the sent email message.

6. The method of claim 5, wherein a visual representation corresponding to the sent email message comprises a representation of the expected response time.

7. The method of claim 5, further comprising filtering one or more user selected email messages from the set of sent email messages based on input from the user indicating that the user does not expect a response to the one or more selected email messages.

8. The method of claim 5, further comprising adjusting the expected response time based on schedule information of the recipient of the sent email message.

9. The method of claim 8, wherein the schedule information comprises a timezone of the recipient and one or more calendar items of the recipient.

10. The method of claim 1, wherein each of the visual representations corresponds to a response time trend for a current day of the week.

11. The method of claim 10, wherein each of the visual representations corresponds to a response time trend for a current time of day for the current day of the week.

12. A computer-readable storage device with an executable program stored thereon, wherein the program instructs a processor to perform:
   identifying a set of email messages for a user;
   determining one or more response time trends, each response time trend corresponding to at least one email message in the set of email messages;
   creating for display, a visual representation of each response time trend to the user such that each visual representation of a response time trend is visually associated with the at least one corresponding email message in the set of email messages, wherein the visual representation and corresponding response time trend are selected for association with one of the email messages based on a content identifier for the email message, the visual representation comprising an identifier representing the content identifier;
   sorting the set of email messages in sequential order from a shortest response time to a longest response time based on the one or more response time trends;
   updating, dynamically, one or more of the displayed visual representations based on the schedule information; and
   placing an email message toward an end of the displayed set of email messages based on an email response to the email message.

13. An apparatus comprising:
   an email identification module configured to identify a set of email messages for a user;
   a response time module configured to determine a plurality of response times corresponding to one of a sender and a recipient for one or more email messages in the set, each response time based on an elapsed time between a send time that the user sends an email message and a receive time that the user receives a response email to the email message;
   a trend module configured to determine one or more response time trends based on the plurality of response times and to associate each response time trend with at least one email message in the set based on the corresponding one of a sender and a recipient;
a response time display module configured to create for display, a visual representation of each response time trend to the user such that each visual representation of a response time trend is visually associated with the at least one corresponding email message in the set of email messages, wherein the visual representation and corresponding response time trend are selected for association with one of the email messages based on a content identifier for the email message, the visual representation comprising an identifier representing the content identifier;
a sort module configured to sort the set of email messages corresponding to the plurality of recipients in sequential order from a shortest response time to a longest response time based on the one or more response time trends;
a schedule module configured to dynamically update one or more of the visual representations based on schedule information of the recipient; and
a responded module configured to place an email message toward an end of the displayed set of email messages based on an email response to the email message.

14. The method of claim 1, further including displaying the visual representation.

15. The computer-readable storage device of claim 12, wherein the program further instructs the processor to perform: displaying the visual representation.

16. The method of claim 13, wherein the response time display module is further configured to display the visual representation.

* * * * *